(12) United States Patent
Lee et al.

(10) Patent No.: US 8,761,939 B2
(45) Date of Patent: Jun. 24, 2014

(54) ROBOT SYSTEM AND CONTROL METHOD THEREOF

(75) Inventors: Dong Hun Lee, Ansan-si (KR); Dong Min Shin, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 285 days.

(21) Appl. No.: 13/217,547

(22) Filed: Aug. 25, 2011

(65) Prior Publication Data

US 2012/0116588 A1 May 10, 2012

(30) Foreign Application Priority Data

Nov. 9, 2010 (KR) ........................ 10-2010-0110836

(51) Int. Cl.
*G05D 1/02* (2006.01)

(52) U.S. Cl.
USPC ........................................... 700/259; 367/87

(58) Field of Classification Search
USPC ............ 700/245, 258, 259, 262, 255; 701/23; 367/87, 118, 124, 128; 318/568.12; 180/167
See application file for complete search history.

(56) References Cited

U.S. PATENT DOCUMENTS 6,459,955 B1 * 10/2002 Bartsch et al. ................ 700/245
7,024,278 B2 * 4/2006 Chiappetta et al. ........... 700/245
7,630,792 B2 * 12/2009 Kim ............................. 700/245

FOREIGN PATENT DOCUMENTS

| EP | 1931010 A2 * | 6/2008 |
|---|---|---|
| JP | 2005-43337 | 2/2005 |
| KR | 10-0480144 | 3/2005 |
| KR | 10-0492539 | 5/2005 |
| KR | 10-0815545 | 3/2008 |
| KR | 10-0845531 | 7/2008 |

OTHER PUBLICATIONS

Korean Office Action issued Jul. 18, 2012 in corresponding Korean Patent Application No. 10-2010-0110836.

* cited by examiner

*Primary Examiner* — Dalena Tran

(74) *Attorney, Agent, or Firm* — Staas & Halsey LLP

(57) ABSTRACT

A robot system and a control method thereof in which, when a robot is located in a docking region, the robot calculates a distance by emitting infrared rays and detecting ultrasonic waves oscillated from a charging station, measures a distance from the charging station and performs docking with charging station. The distance between the robot and the charging station is precisely measured, thereby performing smooth and correct docking of the robot with the charging station. Further, the robot emits infrared rays only while performing docking with the charging station and thus reduces power consumption required for infrared ray emission, and wakes up a circuit in the charging station based on the infrared rays emitted from the robot and thus reduces power consumption of the charging station.

18 Claims, 6 Drawing Sheets

ROBOT SYSTEM AND CONTROL METHOD THEREOF

CROSS-REFERENCE TO RELATED APPLICATIONS

This application claims the benefit of Korean Patent Application No. 2010-0110836, filed on Nov. 9, 2010 in the Korean Intellectual Property Office, the disclosure of which is incorporated herein by reference.

BACKGROUND

1. Field

Embodiments relate to a robot system which controls docking of a robot with a charging station and a control method thereof.

2. Description of the Related Art

In general, robots are machines which perform motions similar to humans and thus provide various conveniences to humans, and development of robots is increasing. These robots include industrial robots, household robots, service robots and medical robots according to kinds of robots. A cleaning robot is a typical example of a household robot.

The cleaning robot performs cleaning while traveling in a target region to be cleaned when cleaning instructions are received from a user or at a set cleaning time. Further, the cleaning robot docks with a charging station to charge a battery with power supplied from the charging station when cleaning has been completed or voltage of the battery falls below a reference voltage.

According to one method of performing docking of the cleaning robot with the charging station, the cleaning robot moves along a wall surface and then rotates and travels along a set route when the charging station is detected, thereby docking with the charging station. Since the cleaning robot may rotate one time along the wall surface, as needed, this method is disadvantageous in that, considering the low voltage of the battery, the robot needs to dock with the charging station as quickly as possible.

According to another method of performing docking of the cleaning robot with the charging station, the charging station is attached to a target region to be cleaned by a beacon and the cleaning robot recognizes the beacon using a camera and recognizes a distance from the charging station using the recognized data, thereby docking with the charging station. However, in this case, if luminance of lighting in the target region is changed or an object having a shape similar to that of the beacon is recognized, the cleaning robot may not recognize the position of the charging station. Further, since an expensive camera needs to be attached to the cleaning robot, the production cost of the cleaning robot is raised.

According to a further method of performing docking of the cleaning robot with the charging station, left and right infrared emission units are installed on the charging station to emit infrared rays at all times, the position of the charging station is judged based on an amount of light incident upon the left and right infrared emission units when an infrared ray signal from the charging station is detected during docking, and the cleaning robot moves based on a result of the judgment, thereby docking with the charging station.

In this case, the charging station emits infrared rays at all times and thus power consumption is raised. Further, if power is not supplied from the charging station to the cleaning robot due to a contact failure between terminals although the cleaning robot docks with the charging station, the cleaning robot may judge that docking is not achieved and thus continuously push the charging station forwards in an attempt to dock with the charging station.

SUMMARY

Therefore, it is an aspect of an embodiment to provide a robot system which controls docking of a robot with a charging station and a control method thereof.

Additional aspects of embodiments will be set forth in part in the description which follows and, in part, will be obvious from the description, or may be learned by practice of the embodiments.

In accordance with one aspect of an embodiment, a robot system includes a charging station including an infrared detection unit and a plurality of ultrasonic oscillation units to respectively oscillate ultrasonic waves when the infrared detection unit detects infrared rays, and a robot including an infrared emission unit and an ultrasonic detection unit, controlling driving of the infrared emission unit when the robot is located in a docking region, respectively detecting the ultrasonic waves oscillated from the plurality of ultrasonic oscillation units of the charging station, measuring arrival times of the respective ultrasonic waves, calculating a distance from the charging station based on the respective measured times, and performing docking with the charging station based on the calculated distance.

The robot may judge whether or not the robot is located in the docking region based on map data stored in advance.

The robot may measure a time between when the infrared rays are emitted and when the ultrasonic waves are detected.

The robot may further include a battery unit to supply drive power, a charge capacity detection unit to detect a charge capacity of the battery unit, and a first controller to judge whether or not docking succeeds based on the charge capacity detected by the charge capacity detection unit and to control backward movement of the robot and control re-docking upon judging that docking fails.

The plurality of ultrasonic oscillation units may include a first ultrasonic oscillation unit and a second ultrasonic oscillation unit, and the first ultrasonic oscillation unit and the second ultrasonic oscillation unit may be located at positions symmetrical about the infrared detection unit.

The infrared emission unit of the robot may emit infrared rays having a first code corresponding to the first ultrasonic oscillation unit and emit infrared rays having a second code corresponding to the second ultrasonic oscillation unit.

The charging station may further include a second controller to control driving of the first ultrasonic oscillation unit when the infrared rays having the first code are detected and to control driving of the second ultrasonic oscillation unit when the infrared rays having the second code are detected.

In accordance with another aspect of an embodiment, a control method of a robot system, which controls movement of a robot to dock with a charging station, includes judging whether or not the robot is located in a predetermined docking region, emitting infrared rays to the charging station through an infrared emission unit upon judging that the robot is located in the docking region, detecting ultrasonic waves respectively oscillated from a plurality of ultrasonic oscillation units of the charging station through an ultrasonic detection unit, measuring arrival times of the respective detected ultrasonic waves, calculating a distance between the robot and the charging station based on the respective measured times, and controlling movement of the robot based on the calculated distance.

The judgment as to whether the robot is located in the docking region may include judging whether or not the robot is located in the docking region based on map data stored in advance.

The control method may further include recognizing, when the charging station detects the infrared rays through an infrared detection unit, a code of the detected infrared rays, driving a first ultrasonic oscillation unit if the recognized code is a first code, and driving a second ultrasonic oscillation unit if the recognized code is a second code.

The emission of the infrared rays to the charging station may include emitting infrared rays having the first code upon judging that the robot is located in the docking region, and emitting infrared rays having the second code if first ultrasonic waves oscillated from the first ultrasonic oscillation unit are detected.

The emission of the infrared rays having the second code may include emitting the infrared rays having the second code if a designated time from the detection of the first ultrasonic waves elapses.

The measurement of the arrival times of the ultrasonic waves may include measuring a first time between when the infrared rays having the first code are emitted and when the first ultrasonic waves oscillated from the first ultrasonic oscillation unit are detected, and measuring a second time between when the infrared rays having the second code are emitted and when the second ultrasonic waves oscillated from the second ultrasonic oscillation unit are detected.

The control method may further include calculating a first distance corresponding to the first time and calculating a second distance corresponding to the second time.

The control method may further include judging whether or not the first distance and the second distance are equal, calculating a distance between the infrared emission unit and the infrared detection unit of the charging station based on the first distance and the second distance upon judging that the first distance and the second distance are equal, and controlling movement of the robot based on the calculated distance.

The control method may further include calculating a distance and an angle between the infrared emission unit and the infrared detection unit of the charging station based on the first distance and the second distance upon judging that the first distance and the second distance are not equal, predicting a position where a distance between the ultrasonic detection unit and the first ultrasonic oscillation unit and a distance between the ultrasonic detection unit and the second ultrasonic oscillation unit become equal based on the calculated distance and angle, and controlling movement of the robot to the predicted position.

The control of the movement of the robot based on the calculated distance may include performing docking of the robot with the charging station, judging whether or not docking succeeds, and performing re-docking of the robot with the charging station by controlling backward movement of the robot upon judging that docking fails.

The judgment as to whether or not docking succeeds may include recognizing a charge capacity of a battery unit, and judging whether or not docking succeeds based on the recognized charge capacity.

BRIEF DESCRIPTION OF THE DRAWINGS

These and/or other aspects of embodiments will become apparent and more readily appreciated from the following description of the embodiments, taken in conjunction with the accompanying drawings of which.

DETAILED DESCRIPTION

Figure 1:
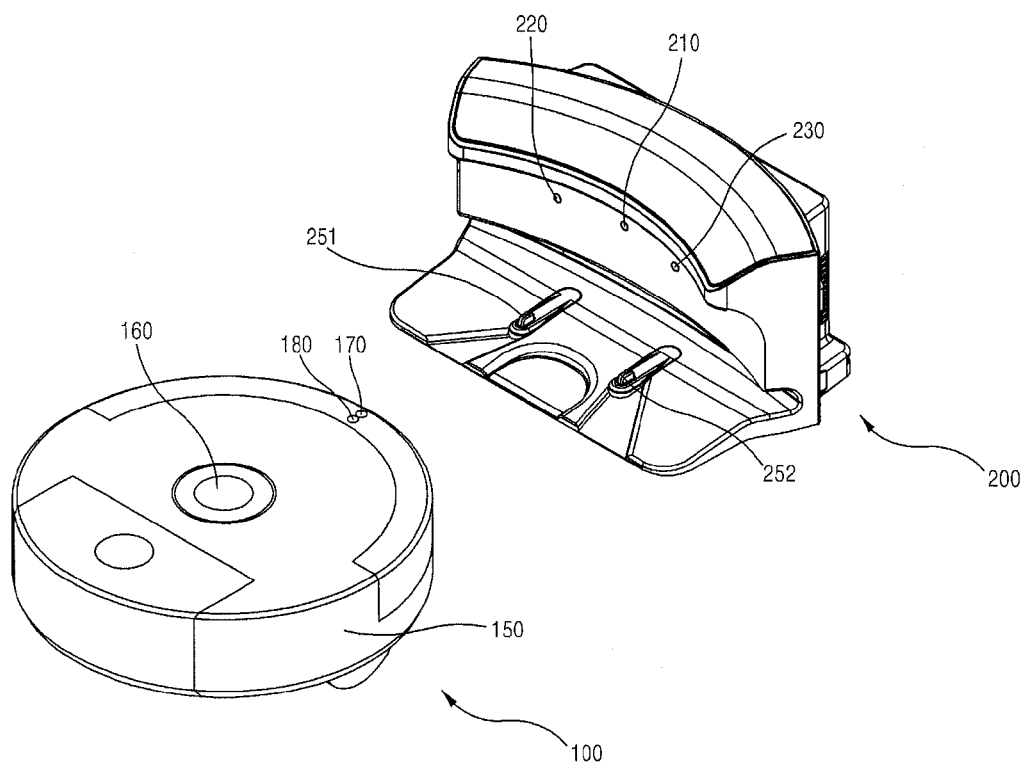
FIG. 1 is a perspective view illustrating a configuration of a robot system in accordance with an embodiment.

Reference will now be made in detail to embodiments, examples of which are illustrated in the accompanying drawings, wherein like reference numerals refer to like elements throughout.

Figure 2:
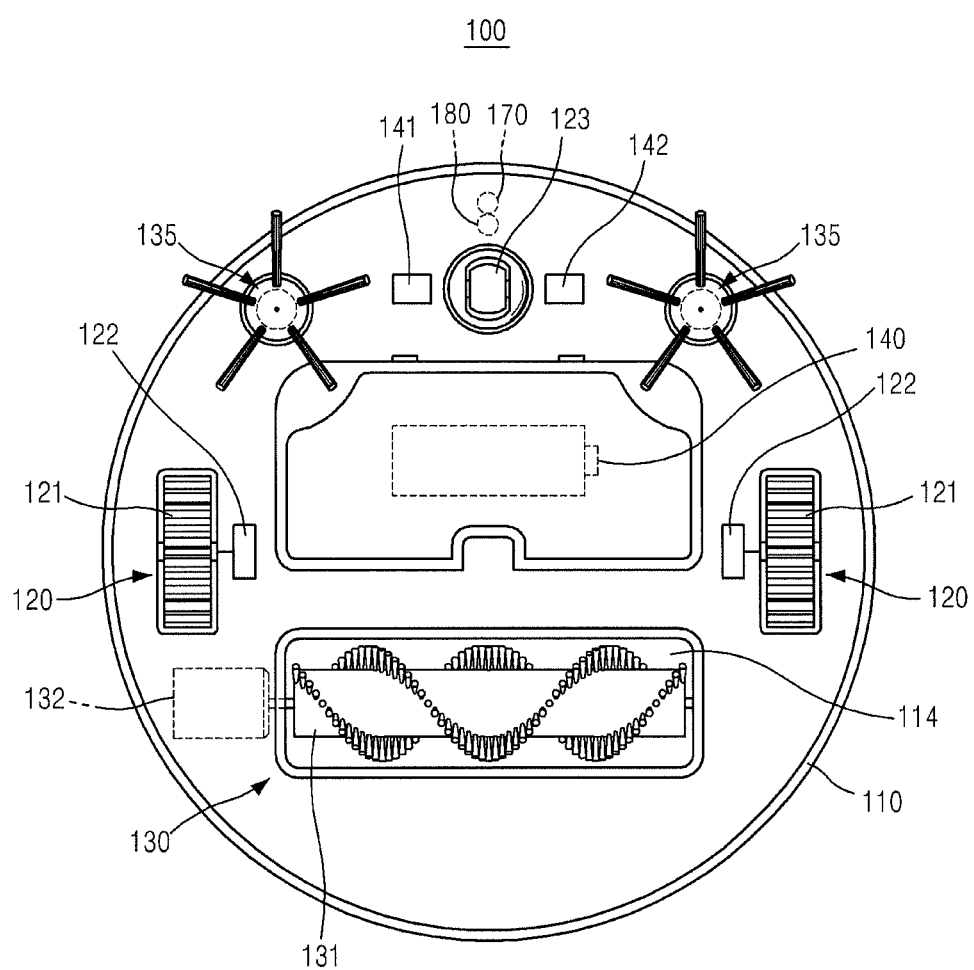
FIG. 2 is an exemplary view of a robot of the robot system in accordance with an embodiment.

FIG. 1 is a perspective view illustrating a configuration of a robot system in accordance with an embodiment, and FIG. 2 is an exemplary view of a robot of the robot system in accordance with an embodiment.

The robot system in accordance with an embodiment includes a robot 100 and a charging station 200. Hereinafter, a cleaning robot will be exemplarily described as the robot 100 of the robot system.

The cleaning robot 100 sucks foreign substances, such as dust, from a floor while traveling about the floor within a target region to be cleaned by itself without manipulation by a user, thereby autonomously cleaning the target region.

Such a cleaning robot 100 detects a distance from an obstacle installed in the target region, such as a piece of furniture or office supplies or a wall, through a distance sensor, and selectively drives wheels as a result of the detection to clean the target region while changing its course by itself. Here, the cleaning robot 100 travels using map data stored therein and thus cleans the target region.

If the cleaning robot 100 completes cleaning or battery power of the cleaning robot 100 falls below a predetermined reference value, the cleaning robot 100 moves to the charging station 200, performs docking with the charging station 200, and then performs charging with power supplied from the charging station.

The cleaning robot 100 includes a main body 110 forming the external appearance of the cleaning robot 100, a movement unit 120 installed on the lower surface of the main body 110 to move the cleaning robot 100, and a brush unit 130 and 135 installed on the lower surface of the main body 110 to sweep or scatter dust from a floor.

The movement unit 120 includes a pair of wheels 121 installed at both sides of the central portion of the main body 110 to move the cleaning robot 100 forwards and backwards and to rotate the cleaning robot 100, wheel motors 122 applying moving force to the respective wheels 121, and a caster wheel 123 installed at the front portion of the main body 110 and rotated at various angles according to the state of the floor on which the cleaning robot 100 moves.

Here, the caster wheel 123 serves to stabilize the pose of the cleaning robot 100 and to prevent the cleaning robot 100 from falling over so as to support the cleaning robot, and may be a roller or a wheel having a caster shape.

The brush unit 130 and 135 includes a main brush 130 provided at a suction port 114 formed on the lower surface of the main body 110 and side brushes 135 provided on the front portion of the lower surface of the main body 110.

Here, the main brush 130 sweeps or scatters dust from the floor under the main body 110, thereby improving dust sucking efficiency. The main brush 130 includes a drum-shaped brush member 131 including a roller and a brush, and a brush motor 132 to rotate the brush member 131.

The side brushes 135 sweep dust from the floor at the front portion of the cleaning robot 100 and dust of the floor at a place, which the main brush 130 cannot sweep, toward the suction port 114, thereby improving cleaning efficiency.

The cleaning robot 100 further includes a dust collector (not shown) provided near the main brush 130 to collect foreign substances, such as dust gathered by the main brush 130. Such a cleaning robot 100 may collect foreign substances using suction force.

The cleaning robot 100 further includes a battery unit 140 to supply drive power to the wheel motors 122, the brush motor 132 and other drive units, and charging terminals 141 and 142 electrically connected to the battery unit 140 and electrically connected to the charging station 200 when the cleaning robot 100 docks with the charging station 200.

The battery unit 140 includes a secondary battery which is rechargeable, and is charged with power supplied from the charging station 200 through the charging terminals 141 and 142.

The cleaning robot 100 further includes a bumper 150 mounted on the front surface of the main body 110 to relieve impact when the cleaning robot 100 collides with an obstacle. The bumper 150 may be mounted on the rear surface of the main body 110. The cleaning robot 100 may further include a contact sensor (not shown) and a proximity sensor (not shown) mounted near the bumper 150 to detect obstacles.

The cleaning robot 100 further includes a display unit 140 mounted on the upper surface of the main body 110 to display drive data of the cleaning robot 100.

The cleaning robot 100 further includes an infrared emission unit 170 and an ultrasonic detection unit 180 to measure a distance from the charging station 200 while performing docking with the charging station 200. The infrared emission unit 170 emits infrared rays to the charging station 200, and the ultrasonic detection unit 180 detects first and second ultrasonic waves oscillated from the charging station 200.

The cleaning robot 100 further includes a first controller 190 to control driving of the infrared emission unit 170, to calculate a distance from the charging station 200 based on the first and second ultrasonic waves detected by the ultrasonic detection unit 180 and to control movement of the cleaning robot 100 based on the calculated distance, and a drive unit 195 to output a drive signal to the wheel motors 122 based on a control signal from the first controller 190. These components will be described later in more detail with reference to FIG. 3.

The infrared emission unit 170 is mounted on the center of the front surface of the main body 110 so as to effectively emit infrared rays, and the ultrasonic detection unit 180 is mounted on the center of the front surface of the main body 110 so as to effectively detect the first and second ultrasonic waves.

In order to minimize reflection, refraction, absorption and scattering of infrared rays emitted from the infrared emission unit 170, the infrared emission unit 170 is provided in front of the ultrasonic detection unit 180. Here, "front" means a forward moving direction of the cleaning robot 100.

The ultrasonic detection unit 180 of the cleaning robot 100 is provided at a position where ultrasonic waves are easily detected. That is, the ultrasonic detection unit 180 of the cleaning robot 100 is provided at a height similar to that of first and second ultrasonic oscillation units 220 and 230 of the charging station 200.

The charging station 200 includes an infrared detection unit 210 to detect the infrared rays emitted from the infrared emission unit 170 of the cleaning robot 100, the first and second ultrasonic oscillation units 220 and 230 to oscillate ultrasonic waves to the cleaning robot 100, and power terminals 251 and 252 electrically connected with the charging terminals 141 and 142 of the cleaning robot 100 to supply power to the cleaning robot 100 when the cleaning robot 100 docks with the charging station 200.

Here, the first ultrasonic oscillation unit 220 and the second ultrasonic oscillation unit 230 are provided at positions symmetrical about the infrared detection unit 210, and a distance d between the infrared detection unit 210 and the first ultrasonic oscillation unit 220 and a distance d between the infrared detection unit 210 and the second ultrasonic oscillation unit 230 are equal.

The infrared detection unit 210 of the charging station 200 is provided at a position where infrared rays are easily detected. That is, the infrared detection unit 210 of the charging station 200 is provided at a height similar to that of the infrared emission unit 170 of the cleaning robot 100.

The charging station 200 further includes a second controller 240 to wake up the respective drive units when the infrared detection unit 210 detects infrared rays, and to sequentially drive the first and second ultrasonic oscillation units 220 and 230 based on the detected infrared rays, and a power supply unit 250 to convert and rectify external commercial power into power to charge the cleaning robot 100 and then to supply the rectified power to the cleaning robot 100. These components will be described later in more detail with reference to FIG. 3.

Figure 3:
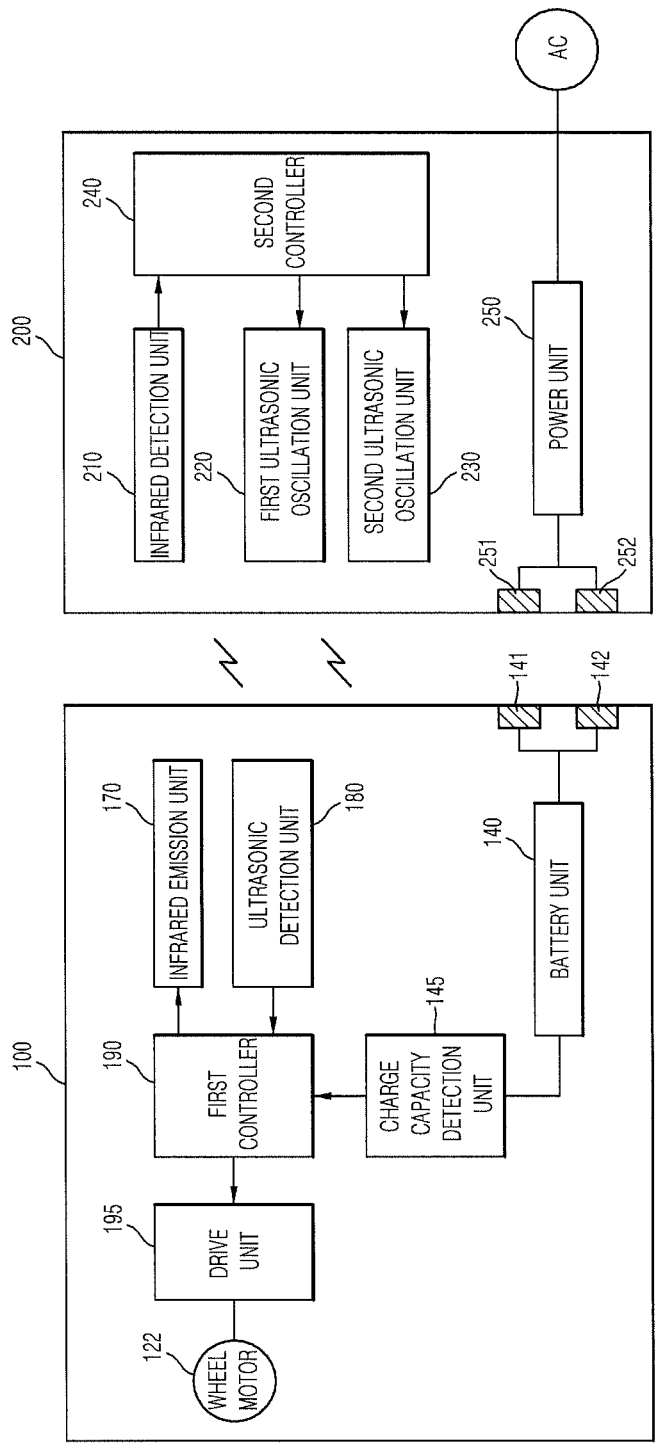
FIG. 3 is a control block diagram of the robot system in accordance with an embodiment.

FIG. 3 is a control block diagram of the robot system in accordance with an embodiment. The cleaning robot 100 includes the battery unit 140, a charge capacity detection unit 145, the infrared emission unit 170, the ultrasonic detection unit 180, the first controller 190 and the drive unit 195. The charging station 200 includes the infrared detection unit 210, the first ultrasonic oscillation unit 220, the second ultrasonic oscillation unit 230, the second controller 240 and the power supply unit 250.

The battery unit 140 of the cleaning robot 100 is charged with power supplied from the charging station 200, and supplies the charged power to respective drive units of the cleaning robot 100.

The charge capacity detection unit 145 of the cleaning robot 100 detects current and voltage of the battery unit 140 in order to measure a charge capacity of the battery unit 140, and transmits the detected current and voltage to the first controller 190.

The infrared emission unit 170 of the cleaning robot 100 emits infrared rays having a first code according to instructions from the first controller 190 when the infrared emission unit 170 is located at a predetermined docking region, and emits infrared rays having a second code according to instructions from the first controller 190 after a designated time from detection of first ultrasonic waves has elapsed. Here, the infrared rays emitted from the infrared emission unit 170 are used to measure time required for first and second ultrasonic waves to reach to the cleaning robot 100 from the charging station 200, and time when the infrared rays are emitted is used as time when the first and second ultrasonic waves are oscillated.

That is, time when the infrared rays having the first code are emitted serves as time when the first ultrasonic waves are oscillated, and time when the infrared rays having the second code are emitted serves as time when the second ultrasonic waves are oscillated.

As described above, docking of the cleaning robot with the charging station is performed using the low-priced infrared emission unit and infrared detection unit, thereby reducing the production costs the robot and the charging station, simplifying circuits of the robot and the charging station, and reducing signal interference to increase accuracy in detection of infrared rays.

Moreover, the cleaning robot emits infrared rays only during control of docking with the charging station, thereby lowering power consumption necessary for emission of infrared rays.

The ultrasonic detection unit 180 of the cleaning robot 100 detects the first ultrasonic waves oscillated from the first ultrasonic oscillation unit 220 of the charging station 200 and transmits a signal corresponding to the detected first ultrasonic waves to the first controller 190, and detects the second ultrasonic waves oscillated from the second ultrasonic oscillation unit 230 of the charging station 200 and transmits a signal corresponding to the detected second ultrasonic waves to the first controller 190.

The first controller 190 of the cleaning robot 100 transmits a drive control signal for the wheel motors 122 to the drive unit 195 based on map data stored in a storage unit (not shown). Thereby, the cleaning robot 100 travels about a target region to be cleaned based on the map data, thereby cleaning the target region.

The first controller 190 recognizes a charge capacity of the battery unit 140 based on voltage and current of the battery unit 140 transmitted from the charge capacity detection unit 145 during traveling of the cleaning robot 100.

In more detail, the first controller 190 analyzes the voltage and current of the battery unit 140 and obtains charge capacity data of the battery unit 140 corresponding to the analyzed voltage and current from a table stored in the storage unit (not shown).

Here, the table stored in the storage unit represents charge capacity data according to voltage and current of the battery unit 140.

The first controller 190 compares the recognized charge capacity with a reference capacity and judges whether or not the recognized charge capacity is less than the reference capacity, and controls docking of the cleaning robot 100 with the charging station 200 upon judging that the recognized charge capacity is less than the reference capacity.

Further, the first controller 190 controls docking of the cleaning robot 100 with the charging station 200 if cleaning has been completed.

The first controller 190 transmits the drive control signal for the wheel motors 122 to the drive unit 195 such that the cleaning robot 100 moves to the charging station 200 based on the map data during control of docking of the cleaning robot 100 with the charging station 200.

The first controller 190 judges whether or not a position thereof is located in a predetermined docking region, controls driving of the infrared emission unit 170 upon judging that the position of the first controller 190 is located in the docking region, and calculates a distance between the first ultrasonic oscillation unit 220 and the ultrasonic detection unit 180, i.e., a first distance by measuring a first time between when infrared rays having the first code are emitted and when the first ultrasonic wave signal is detected when the first ultrasonic wave signal is transmitted from the ultrasonic wave detection unit 180.

The first controller 190 controls driving of the infrared emission unit 170 after a designated time from when the first ultrasonic wave signal is detected, and calculates a distance between the second ultrasonic oscillation unit 230 and the ultrasonic detection unit 180, i.e., a second distance by measuring a second time between when infrared rays having the second code are emitted and when the second ultrasonic wave signal is detected when the second ultrasonic wave signal is transmitted from the ultrasonic wave detection unit 180.

Further, the first controller 190 controls the infrared emission unit 170 so as to emit the infrared rays having the first code to control driving of the first ultrasonic oscillation unit 220, and controls the infrared emission unit 170 so as to emit the infrared rays having the second code to control driving of the second ultrasonic oscillation unit 230.

The first controller 190 transmits a drive control signal for the wheel motors 22, to enable the cleaning robot 100 to move to a position where the first distance and the second distance become equal, to the drive unit 195, calculates a distance from the charging station 200 based on the first distance and the second distance when the first distance and the second distance become equal, and transmits a drive control signal for the wheel motors 22, to enable the cleaning robot 100 to move by the calculated distance, to the drive unit 195. Here, the cleaning robot 100 travels straightly to the charging station 200, thereby performing docking with the charging station 200.

The first controller 190 judges whether or not the charging terminals 141 and 142 and the power terminals 251 and 252 contact based on the voltage and current transmitted from the charge capacity detection unit 145, when movement of the cleaning robot 100 by the calculated distance has been completed, thereby judging whether or not docking of the cleaning robot 100 with the charging station 200 succeeds.

The first controller 190 transmits a drive control signal for the wheel motors 122 to the drive unit 195 upon judging that docking of the cleaning robot 100 with the charging station 200 fails. Thereafter, the cleaning robot 100 moves backwards and again moves forwards, thereby retrying docking of the cleaning robot 100 with the charging station 200.

The first controller 190 recognizes a charge capacity of the battery unit 140 based on the voltage and current of the battery unit 140 transmitted from the charge capacity detection unit 145, thereby controlling completion of charging of the battery unit 140.

The drive unit 195 of the cleaning robot 100 generates drive signals for the wheel motors 122 based on the control signal transmitted from the first controller 190, and transmits the generated drive signals to the wheel motors 122 to drive the wheel motors 122.

The infrared detection unit 210 of the charging station 200 detects the infrared rays emitted from the cleaning robot 100, and transmits a signal corresponding to the detected infrared rays to the second controller 240.

When the infrared rays are detected, the charging station 200 wakes up a circuit therein using the signal corresponding to the detected infrared rays.

As described above, the charging station 200 wakes up the circuit therein based on the infrared rays emitted from the cleaning robot 100, thereby reducing power consumption of the charging station 200.

The first and second ultrasonic oscillation units 220 and 230 of the charging station 200 oscillate ultrasonic waves according to instructions from the second controller 240. Here, the first and second ultrasonic oscillation units 220 and 230 sequentially oscillate ultrasonic waves whenever infrared rays are detected. Here, first and second ultrasonic waves may have different frequencies such that the cleaning robot 100 may easily differentiate the first and second ultrasonic waves oscillated from the first and second ultrasonic oscillation units 220 and 230.

The second controller 240 of the charging station 200 recognizes, when the infrared ray signal is received from the infrared detection unit 210, the code of the received infrared ray signal by analyzing the infrared ray signal, controls oscillation of ultrasonic waves of the first ultrasonic oscillation unit 220 if the recognized code is the first code, and controls oscillation of ultrasonic waves of the second ultrasonic oscillation unit 230 if the recognized code is the second code.

The power supply unit 250 of the charging station 200 is connected to an external commercial power source, and receives AC power from the external commercial power source.

The power supply unit 250 includes a transformer to convert power supplied from the outside, a rectifier to perform half-wave rectification and full-wave rectification of the converted power, a smoother to smooth the rectified power, and a voltage controller to convert the smoothed power into DC power having regular voltage and to output the DC power. The power supply unit 250 supplies the DC power output from the voltage controller to the cleaning robot 100 through the power terminals 251 and 252.

Figure 4:
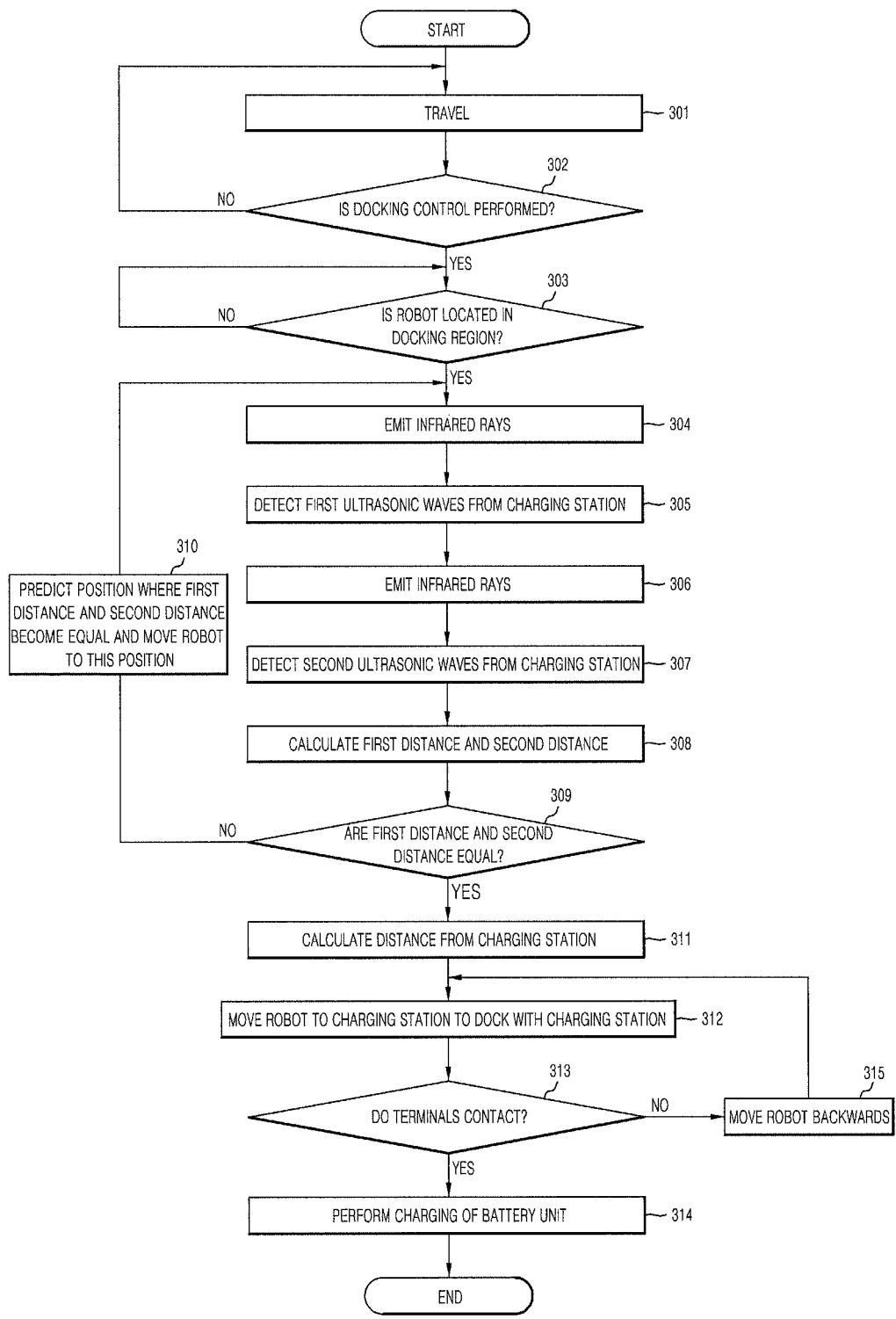
FIG. 4 is a flow chart illustrating a control method of the robot system in accordance with an embodiment.
Figure 5:
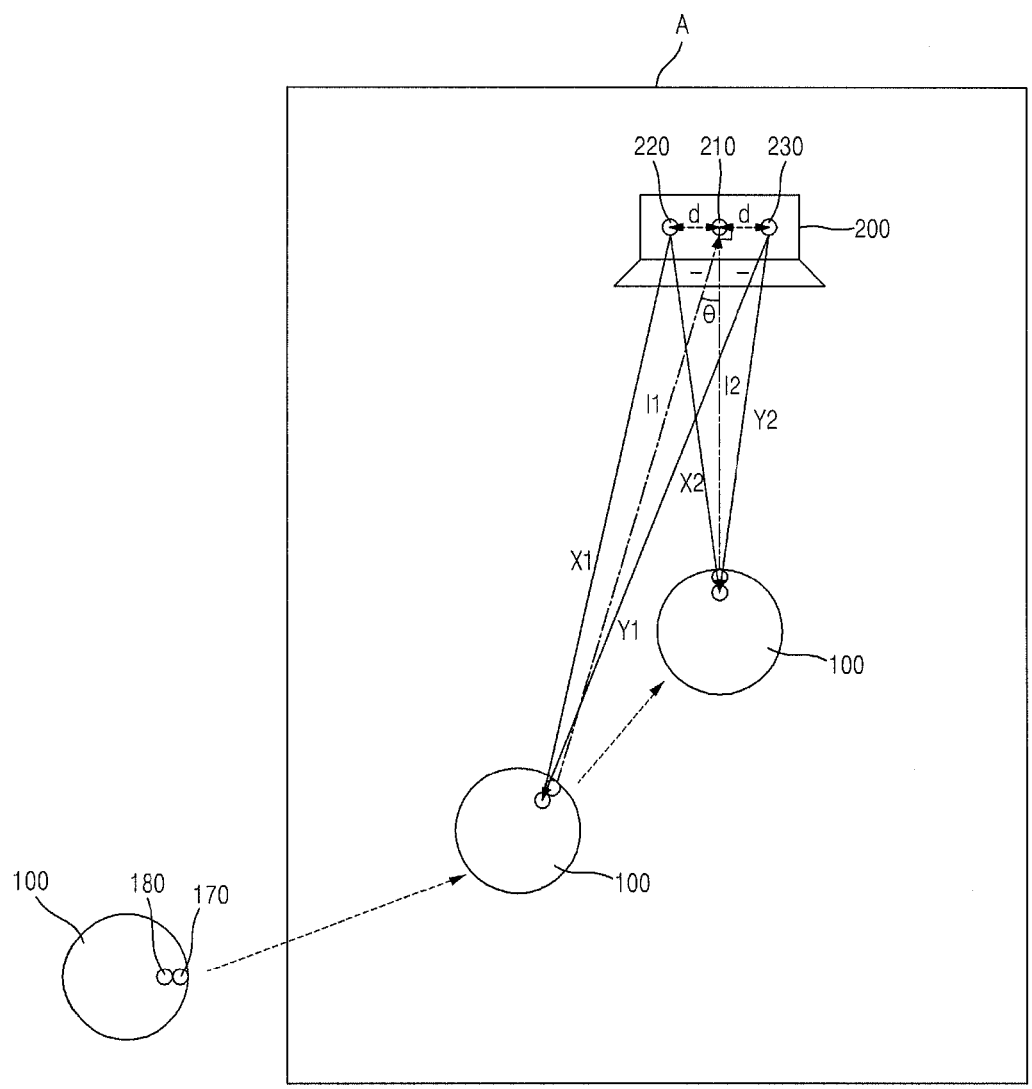
FIG. 5 is an exemplary view illustrating docking of the robot system in accordance with an embodiment.
Figure 6:
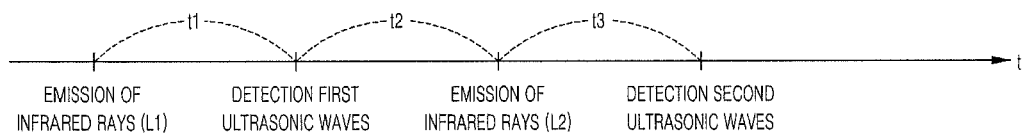
FIG. 6 is an exemplary view illustrating docking signal transmission/reception of the robot system in accordance with an embodiment.

FIG. 4 is a flow chart illustrating a control method of the robot system in accordance with an embodiment. Hereinafter, the control method of the robot system will be described with reference to FIGS. 5 and 6. Here, FIG. 5 is an exemplary view illustrating docking of the robot system in accordance with an embodiment, and FIG. 6 is an exemplary view illustrating docking signal transmission/reception of the robot system in accordance with an embodiment.

The cleaning robot 100 receives power supplied from the charging station 200 while maintaining a docking state with the charging station 200, thus performing charging of the battery unit 140.

When cleaning instructions are received from a user or at a set cleaning time during docking of the cleaning robot 100 with the charging station 200, the cleaning robot 100 cleans a target region to be cleaned based on map data stored in advance while traveling about the target region (operation 301).

Thereafter, the cleaning robot 100 judges whether or not docking control is performed based on at least one of charge capacity data of the battery unit 140 and whether or not cleaning has been completed during traveling for cleaning (operation 302).

Hereinafter, judgment as to whether or not docking control is performed (operation 302) will be exemplarily described.

The cleaning robot 100 periodically analyzes voltage and current of the battery unit 140 transmitted from the charge capacity detection unit 145 during cleaning, and obtains charge capacity data of the battery unit 140 by detecting the charge capacity data corresponding to the analyzed voltage and current from the table stored in the storage unit (not shown).

Thereafter, the cleaning robot 100 judges whether or not the charge capacity of the battery unit 140 is less than a reference capacity through comparison, performs docking control to dock with the charging station 200 if the charge capacity is less than the reference capacity, and continues to perform cleaning so long as the charge capacity exceeds the reference capacity.

Further, the cleaning robot 100 judges whether or not cleaning has been completed based on the map data during traveling for cleaning, and performs docking control to dock with the charging station 200 upon judging that cleaning has been completed.

Hereinafter, docking of the cleaning robot 100 with the charging station 200 will be described in detail.

In order to dock with the charging station 200, the cleaning robot 100 judges whether or not the cleaning robot 100 itself is located in a docking region A based on the map data while traveling to the position of the charging station 200 based on the map data (operation 303).

As shown in FIG. 5, the cleaning robot 100 emits infrared rays L1 having the first code through the infrared emission unit 170 upon judging that the cleaning robot 100 is located in the docking region A (operation 304), and detects first ultrasonic waves oscillated from the first ultrasonic oscillation unit 220 of the charging station 200 (operation 305).

Further, when a signal corresponding to the infrared rays is detected, the charging station 200 recognizes the code of the detected infrared rays by analyzing the signal. Here, the charging station 200 controls driving of the first ultrasonic oscillation unit 220 to oscillate the first ultrasonic waves, if the recognized code is the first code.

Thereafter, the cleaning robot 100 emits infrared rays L2 having the second code through the infrared emission unit 170 when a designated time from detection of the first ultrasonic waves elapses (operation 306), and detects second ultrasonic waves oscillated from the second ultrasonic oscillation unit 230 of the charging station 200 (operation 307).

Further, when a signal corresponding to the infrared rays is detected, the charging station 200 recognizes the code of the detected infrared rays by analyzing the signal. Here, the charging station 200 controls driving of the second ultrasonic oscillation unit 230 to oscillate the second ultrasonic waves, if the recognized code is the second code.

As shown in FIG. 6, the cleaning robot 100 measures a first time t1 taken for the first ultrasonic waves oscillated from the first ultrasonic oscillation unit 220 of the charging station 20 to reach the ultrasonic detection unit 180 of the cleaning robot 100 by counting a period from when the infrared rays L1 having the first code are emitted to when the first ultrasonic waves are detected, and calculates a first distance X1 between the first ultrasonic oscillation unit 220 of the charging station 200 and the ultrasonic detection unit 180 of the cleaning robot 100 based on the measured first time t1.

After a designated time t2 from detection of the first ultrasonic waves has elapsed, the cleaning robot 100 measures a second time t3 taken for the second ultrasonic waves oscillate from the second ultrasonic oscillation unit 230 of the charging station 20 to reach the ultrasonic detection unit 180 of the cleaning robot 100 by counting a period from when the infrared rays L2 having the second code are emitted to when the second ultrasonic waves are detected, and calculates a second distance Y1 between the second ultrasonic oscillation unit 230 of the charging station 200 and the ultrasonic detection unit 180 of the cleaning robot 100 based on the measured second time t3 (operation 308).

Here, actual distances are calculated by multiplying the measured times t1 and t3 by the velocity of sound (340 m/sec).

Thereafter, the cleaning robot 100 judges whether or not the first distance X1 and the second distance Y2 are equal (operation 309).

The cleaning robot 100 calculates a distance I1 and an angle θ between the infrared emission unit 170 and the infrared detection unit 210 of the charging station 200 based on the first distance X1 and the second distance Y2, if the first distance X1 and the second distance Y2 are not equal.

The angle θ is calculated by subtracting 90° from an angle between a horizontal line, formed by the infrared detection unit 210 and the first and second ultrasonic oscillation units 220 and 230, and the infrared emission unit 170, and is used to predict a position where the first distance X1 and the second distance Y2 become equal.

Here, calculation of the distance I1 and the angle θ based on the first distance X1 and the second distance Y2 is based upon triangulation.

At this time, a distance d between the infrared detection unit 210 and the first ultrasonic oscillation unit 220 and a distance d between the infrared detection unit 210 and the second ultrasonic oscillation unit 230 are used. The two distances d are predetermined so as to be equal.

Thereafter, the cleaning robot 100 predicts the position where the first distance and the second distance become equal based on the distance I1 and the angle θ between the infrared emission unit 170 and the infrared detection unit 210 of the charging station 200, and moves to the predicted position (operation 310).

Thereafter, operation 304 to operation 309 are repeated.

As shown in FIG. 5, the cleaning robot 100 calculates a distance I2 between the infrared emission unit 170 and the infrared detection unit 210 of the charging station 200 based on the first distance X1 and the second distance Y2, if the first distance X1 and the second distance Y2 are equal.

Here, calculation of the distance I2 between the infrared emission unit 170 and the infrared detection unit 210 of the charging station 200 is based upon triangulation.

At this time, the distance d between the infrared detection unit 210 and the first ultrasonic oscillation unit 220 and the distance d between the infrared detection unit 210 and the second ultrasonic oscillation unit 230 are used.

Thereafter, the cleaning robot 100 travels straightly to the charging station 200 based on the distance I2 between the infrared emission unit 170 and the infrared detection unit 210 of the charging station 200, thereby moving to the charging station 200. That is, the cleaning robot 100 travels straightly by the calculated distance I2, thereby docking with to the charging station 200.

As described above, when the cleaning robot 100 is located in the docking region, the cleaning robot 100 calculates distances by emitting infrared rays and detecting ultrasonic waves oscillated from the charging station 200, and precisely measures the distance from the charging station 200 based on the calculated distances. Thereby, the cleaning robot 100 may smoothly and precisely dock with the charging station 200.

Thereafter, the cleaning robot 100 judges whether or not docking succeeds upon judging that docking with the charging station 200 has been completed.

That is, the cleaning robot 100 judges whether or not the charging terminals 141 and 141 and the power terminals 251 and 252 of the charging station 200 contact based on the voltage and current of the battery unit 140 detected by the charge capacity detection unit 145 (operation 313), thereby judging whether or not docking succeeds.

The cleaning robot 100 continuously performs charging of the battery unit 140 upon judging that docking succeeds (operation 314). Here, the charging station 200 converts and rectifies external AC power and the supplies the rectified power to the cleaning robot 100 upon judging that docking succeeds.

Further, the cleaning robot 100 performs charging of the battery unit 140 with the DC power from the charging station 200, and recognizes a charge capacity of the battery unit 140 based on the voltage and current of the battery unit 140 transmitted from the charge capacity detection unit 145 during charging, thereby controlling completion of charging of the battery unit 140.

On the other hand, the cleaning robot 100 moves backwards by a designated distance upon judging that docking fails (operation 315) and moves forwards again to retry docking with the charging station 200, and judges whether or not docking succeeds as a result of the retry. That is, in order to judge whether or not docking succeeds, operation 313 and operation 314 are repeated.

As described above, the cleaning robot 100 moves backwards and retries docking with the charging station 200 upon judging that docking fails, thereby increasing a docking success rate.

As is apparent from the above description, in a robot system and a control method thereof in accordance with an embodiment, when a robot is located in a docking region, the robot calculates distances by emitting infrared rays and detecting ultrasonic waves oscillated from a charging station and precisely measures a distance from the charging station based on the calculated distances, thereby performing smooth and correct docking with the charging station.

The robot emits infrared rays only while performing docking with the charging station and thus reduces power consumption required for infrared ray emission, and wakes up a circuit in the charging station based on a signal of the infrared rays emitted from the robot and thus reduces power consumption of the charging station.

The robot judges whether or not docking with the charging station fails, and moves backwards to retry docking with the charging station upon judging that docking with the charging station fails, thereby increasing a docking success rate.

Further, the robot docks with the charging station using low-priced infrared emission unit and infrared detection unit, thereby reducing the production costs of the robot and the charging station, simplifying circuits of the robot and the charging station, and reducing signal interference to increase accuracy in detection of infrared rays.

The embodiments can be implemented in computing hardware and/or software, such as (in a non-limiting example) any computer that can store, retrieve, process and/or output data and/or communicate with other computers. A program/software implementing the embodiments may be recorded on non-transitory computer-readable media comprising computer-readable recording media. Examples of the computer-readable recording media include a magnetic recording apparatus, an optical disk, a magneto-optical disk, and/or a semiconductor memory (for example, RAM, ROM, etc.). Examples of the magnetic recording apparatus include a hard disk device (HDD), a flexible disk (FD), and a magnetic tape (MT). Examples of the optical disk include a DVD (Digital Versatile Disc), a DVD-RAM, a CD-ROM (Compact Disc-Read Only Memory), and a CD-R (Recordable)/RW.

Although a few embodiments have been shown and described, it would be appreciated by those skilled in the art that changes may be made in these embodiments without departing from the principles and spirit of the invention, the scope of which is defined in the claims and their equivalents.

What is claimed is:
1. A robot system comprising:
a charging station including an infrared detection unit and ultrasonic oscillation units; and
a robot including an infrared emission unit and an ultrasonic detection unit, wherein
the robot judges whether or not the robot is located in a docking region,
the robot controls driving of the infrared emission unit to emit infrared rays when it is judged that the robot is located in the docking region,
the infrared detection unit of the charging station detects the emitted infrared rays, the ultrasonic oscillation units of the charging station oscillate ultrasonic waves in response to the detected infrared rays, the ultrasonic detection unit of the robot detects the oscillated ultrasonic waves, and the robot measures times taken for each of the ultrasonic waves oscillated from the ultrasonic oscillation units of the charging station to reach the ultrasonic detection unit of the robot, calculates a distance between the robot and the charging station based on the measured times, and performs docking with the charging station based on the calculated distance.

2. The robot system according to claim 1, wherein the robot judges whether or not the robot is located in the docking region based on map data stored in advance.

3. The robot system according to claim 1, wherein, to measure the times, the robot measures a time between when the infrared rays are emitted and when the ultrasonic waves are detected.

4. The robot system according to claim 1, wherein the robot further includes:
a battery unit to supply drive power;
a charge capacity detection unit to detect a charge capacity of the battery unit; and
a first controller to judge whether or not docking succeeds based on the charge capacity detected by the charge capacity detection unit and to control backward movement of the robot and control re-docking upon judging that docking fails.

5. The robot system according to claim 1, wherein:
the ultrasonic oscillation units include a first ultrasonic oscillation unit and a second ultrasonic oscillation unit; and
the first ultrasonic oscillation unit and the second ultrasonic oscillation unit are located at positions symmetrical about the infrared detection unit.

6. The robot system according to claim 5, wherein the infrared emission unit of the robot emits infrared rays having a first code corresponding to the first ultrasonic oscillation unit and emits infrared rays having a second code corresponding to the second ultrasonic oscillation unit.

7. The robot system according to claim 6, wherein the charging station further includes a controller to control driving of the first ultrasonic oscillation unit when the infrared rays having the first code are detected and to control driving of the second ultrasonic oscillation unit when the infrared rays having the second code are detected.

8. A control method comprising:
judging, by a computer, whether or not a robot is located in a predetermined docking region;
emitting infrared rays by the robot to a charging station upon judging that the robot is located in the docking region;
detecting the emitted infrared rays by the charging station;
oscillating ultrasonic waves by ultrasonic oscillation units of the charging station upon detection of the emitted infrared rays by the charging station,
detecting the oscillated ultrasonic waves by an ultrasonic detection unit of the robot;
measuring, by a computer, times taken for each of the ultrasonic waves oscillated by the ultrasonic oscillation units of the charging station to reach the ultrasonic detection unit of the robot;
calculating, by a computer, a distance between the robot and the charging station, based on the measured times; and
controlling, by a computer, movement of the robot based on the calculated distance to thereby dock the robot with the charging station.

9. The control method according to claim 8, wherein said judging whether or not the robot is located in the docking region includes judging whether or not the robot is located in the docking region based on map data stored in advance.

10. The control method according to claim 8, further comprising:
recognizing, when the charging station detects the infrared rays, a code of the detected infrared rays;
driving a first ultrasonic oscillation unit of the ultrasonic oscillation units of the charging station if the recognized code is a first code; and
driving a second ultrasonic oscillation unit of the ultrasonic oscillation units of the charging station if the recognized code is a second code.

11. The control method according to claim 10, wherein said emitting infrared rays by the robot includes:
emitting infrared rays having the first code upon judging that the robot is located in the docking region; and
emitting infrared rays having the second code if first ultrasonic waves oscillated from the first ultrasonic oscillation unit are detected.

12. The control method according to claim 11, wherein said emitting infrared rays having the second code includes emitting infrared rays having the second code if a designated time from the detection of the first ultrasonic waves elapses.

13. The control method according to claim 11, wherein said measuring times includes:
measuring a first time between when the infrared rays having the first code are emitted and when the first ultrasonic waves oscillated from the first ultrasonic oscillation unit are detected by the ultrasonic detection unit of the robot; and
measuring a second time between when the infrared rays having the second code are emitted and when second ultrasonic waves oscillated from the second ultrasonic oscillation unit are detected by the ultrasonic detection unit of the robot.

14. The control method according to claim 13, further comprising calculating a first distance corresponding to the first time and calculating a second distance corresponding to the second time.

15. The control method according to claim 14, further comprising:
judging whether or not the first distance and the second distance are equal;
calculating a distance between an infrared emission unit of the robot that emits the infrared rays and an infrared detection unit of the charging station that detects the infrared rays based on the first distance and the second distance upon judging that the first distance and the second distance are equal,
wherein said controlling controls the movement of the robot based on the calculated distance.

16. The control method according to claim 15, further comprising:
calculating a distance and an angle between the infrared emission unit and the infrared detection unit based on the first distance and the second distance upon judging that the first distance and the second distance are not equal; and
predicting a position where a distance between the ultrasonic detection unit of the robot and the first ultrasonic oscillation unit and a distance between the ultrasonic detection unit and the second ultrasonic oscillation unit become equal based on the calculated distance and angle, wherein said controlling controls the movement of the robot to the predicted position.

17. The control method according to claim 15, wherein said controlling the movement of the robot based on the calculated distance includes:

performing docking of the robot with the charging station;

judging whether or not docking succeeds; and performing re-docking of the robot with the charging station by controlling backward movement of the robot upon judging that docking fails.

18. The control method according to claim 17, wherein said judging whether or not docking succeeds includes:

recognizing a charge capacity of a battery unit of the robot; and judging whether or not docking succeeds based on the recognized charge capacity.

* * * * *